(12) United States Patent
Heil (10) Patent No.: US 11,452,931 B2
(45) Date of Patent: Sep. 27, 2022

(54) SLIDING BOARD WITH FIBER COMPOSITE MATERIAL

(71) Applicant: Völkl Sports GmbH, Straubing (DE)

(72) Inventor: Tobias Heil, Mitterfels (DE)

(73) Assignee: Völkl Sports GmbH, Straubing (DE)

( * ) Notice: Subject to any disclaimer, the term of this patent is extended or adjusted under 35 U.S.C. 154(b) by 0 days.

(21) Appl. No.: 16/809,744

(22) Filed: Mar. 5, 2020

(65) Prior Publication Data
US 2020/0282291 A1     Sep. 10, 2020

(30) Foreign Application Priority Data
Mar. 8, 2019   (DE) ...................... 10 2019 105 960.7

(51) Int. Cl.
*A63C 5/12* (2006.01)
*A63C 5/00* (2006.01)

(52) U.S. Cl.
CPC .............. *A63C 5/126* (2013.01); *A63C 5/003* (2013.01)

(58) Field of Classification Search
CPC ......... A63C 5/052; A63C 5/124; A63C 5/126; A63C 5/128; A63C 5/003; A63C 5/12; B29L 2031/5263; B29C 70/22; B29C 70/382; B29C 70/543
See application file for complete search history.

(56) References Cited

U.S. PATENT DOCUMENTS

| | | | | |
|---|---|---|---|---|
| 2,695,178 A | * | 11/1954 | Rheinfrank, Jr. ...... | A63C 5/126 280/610 |
| 3,271,216 A | * | 9/1966 | Koller .................... | D04H 11/04 156/72 |
| 3,893,681 A | * | 7/1975 | Manning ................. | A63C 5/12 280/610 |
| 3,902,732 A | * | 9/1975 | Fosha, Jr. .............. | A63C 5/12 428/116 |
| 4,071,264 A | * | 1/1978 | Legrand ................. | A63C 5/12 280/610 |

(Continued)

FOREIGN PATENT DOCUMENTS

| | | | | |
|---|---|---|---|---|
| CH | 713005 A2 | * | 4/2018 | ............... A63C 5/03 |
| CN | 102369275 A | * | 3/2012 | ............... A61P 3/04 |

(Continued)

*Primary Examiner* — Jacob B Meyer
*Assistant Examiner* — Michael T. Walsh
(74) *Attorney, Agent, or Firm* — RatnerPrestia (57) ABSTRACT

A sliding board, preferably a snow sliding board, including: a front sliding board region including a front end of the sliding board; a rear sliding board region including a rear end of the sliding board; and a binding region, extending between the front sliding board region and the rear sliding board region in the longitudinal direction of the sliding board, for fixing a sliding board binding for holding a boot. The snow sliding board exhibits a multi-layered structure including at least: a sliding board core; upper layers which are arranged above the sliding board core; and lower layers which are arranged below the sliding board core. At least one of the upper layers and/or at least one of the lower layers includes a fiber-composite material, wherein the fiber-composite material includes a multitude of fibers, wherein the fiber-composite material in a region exhibits a fiber orientation which varies within the region.

17 Claims, 4 Drawing Sheets

(56) References Cited

U.S. PATENT DOCUMENTS

| | | | | |
|---|---|---|---|---|
| 4,902,548 | A * | 2/1990 | Cholat-Serpoud | F16F 1/368 |
| | | | | 428/102 |
| 5,725,236 | A * | 3/1998 | Stephanova | A63C 5/003 |
| | | | | 280/601 |
| 5,788,259 | A * | 8/1998 | Emig | A63C 5/126 |
| | | | | 280/609 |
| 6,105,991 | A * | 8/2000 | Dodge | A63C 5/12 |
| | | | | 280/602 |
| 6,502,850 | B1 * | 1/2003 | Schaller | A63C 5/12 |
| | | | | 280/610 |
| 7,419,180 | B2 | 9/2008 | Bobrowicz | |
| 2004/0048022 | A1 * | 3/2004 | Pratt | A63C 5/126 |
| | | | | 473/319 |
| 2005/0121881 | A1 * | 6/2005 | Ambuske | A63C 5/12 |
| | | | | 280/610 |
| 2006/0013990 | A1 * | 1/2006 | Brentrup | D04B 21/165 |
| | | | | 428/102 |
| 2006/0181061 | A1 * | 8/2006 | Bobrowicz | D03D 15/56 |
| | | | | 280/602 |
| 2008/0073875 | A1 * | 3/2008 | Krafft | A63C 5/02 |
| | | | | 280/601 |
| 2008/0146102 | A1 * | 6/2008 | Cheung | B29C 43/146 |
| | | | | 441/74 |
| 2009/0179402 | A1 * | 7/2009 | Sylvain | B32B 21/08 |
| | | | | 280/610 |
| 2010/0239856 | A1 * | 9/2010 | Olson | B32B 5/22 |
| | | | | 264/258 |
| 2012/0190473 | A1 * | 7/2012 | Swist | A63B 60/10 |
| | | | | 473/282 |
| 2013/0140795 | A1 * | 6/2013 | Vailli | A63C 5/052 |
| | | | | 280/601 |
| 2013/0270796 | A1 * | 10/2013 | Grilc | A63C 5/003 |
| | | | | 280/609 |
| 2016/0096103 | A1 * | 4/2016 | Olson | A63C 5/003 |
| | | | | 280/14.21 |
| 2017/0113120 | A1 * | 4/2017 | Hill | B32B 27/32 |
| 2017/0122295 | A1 * | 5/2017 | Klein | F03D 1/0675 |
| 2019/0381387 | A1 * | 12/2019 | Heil | A63C 5/07 |
| 2022/0126192 | A1 * | 4/2022 | Johnson | A63C 5/044 |

FOREIGN PATENT DOCUMENTS

| | | | | |
|---|---|---|---|---|
| DE | 4106911 A1 * | 9/1991 | | A63C 5/003 |
| DE | 19810035 A1 * | 6/1999 | | A63C 5/03 |
| DE | 10005202 A1 * | 11/2000 | | D04H 3/115 |
| DE | 60009857 T2 * | 3/2005 | | |
| DE | 102006002669 A1 * | 8/2007 | | A63C 17/01 |
| DE | 202010000504 U1 * | 6/2010 | | A63C 5/12 |
| DE | 202010000504 U1 * | 7/2010 | | A63C 5/003 |
| DE | 102007048562 B4 * | 5/2011 | | B63B 32/20 |
| DE | 102007055532 B4 * | 9/2012 | | A63C 5/12 |
| DE | 202012104147 U1 * | 1/2013 | | A63C 5/0434 |
| DE | 102014005301 A1 | 10/2015 | | |
| DE | 102016005714 A1 * | 11/2017 | | A63C 5/12 |
| EP | 0249372 A2 * | 12/1987 | | B29C 70/865 |
| EP | 1166832 A1 * | 1/2002 | | A63C 5/04 |
| EP | 1806165 A1 * | 7/2007 | | A63C 5/07 |
| EP | 2353670 A2 * | 8/2011 | | A63C 5/056 |
| FR | 2699827 A1 * | 7/1994 | | A63C 5/0411 |
| FR | 2833849 A1 * | 6/2003 | | A63C 5/12 |
| FR | 2922117 A1 * | 4/2009 | | B63B 32/57 |
| JP | 2007112636 A * | 5/2007 | | |
| WO | WO-9901186 A1 * | 1/1999 | | A63C 5/126 |
| WO | WO-0076763 A1 * | 12/2000 | | B32B 17/10036 |
| WO | WO-2004026564 A1 * | 4/2004 | | B29C 53/8016 |
| WO | WO-2008095725 A1 * | 8/2008 | | A63C 5/12 |
| WO | WO-2016133465 A1 * | 8/2016 | | B29C 70/021 |

* cited by examiner

SLIDING BOARD WITH FIBER COMPOSITE MATERIAL

CROSS REFERENCE TO RELATED APPLICATIONS

This application claims priority to German Patent Application No. 10 2019 105 960.7, filed Mar. 8, 2019, the contents of such application being incorporated herein by reference.

FIELD OF THE INVENTION

The invention relates to a sliding board, preferably a snow sliding board. The snow sliding board comprises: a front sliding board region which comprises a front end of the sliding board; a rear sliding board region which comprises a rear end of the sliding board; and a binding region, extending between the front sliding board region and the rear sliding board region in the longitudinal direction of the sliding board, for fixing a sliding board binding for holding a boot. The snow sliding board exhibits a multi-layered structure comprising at least: a sliding board core; one or more upper layer(s) which is/are arranged above the sliding board core; and one or more lower layer(s) which is/are arranged below the sliding board core. An upper layer and/or a lower layer comprises a fiber-composite material comprising a multitude of fibers.

BACKGROUND OF THE INVENTION

In the field of snow sliding boards, in particular snowboards, it is known that fibers such as for example glass fibers or carbon fibers can be used to keep the weight of a snowboard low and simultaneously influence characteristics, such as for example its properties under torsion, positively in a targeted way. Examples of such fiber-reinforced snowboards include those known from DE 10 2014 005 301 A1 and U.S. Pat. No. 7,419,180 B2, each incorporated by reference herein. The fibers or at least most of the fibers extend parallel to a longitudinal axis of the snowboard. In the region in which the binding is fitted, fibers can additionally extend transverse to the longitudinal direction, in order to additionally reinforce this region, wherein these transversely extending fibers form a layer of their own, independently of the layer comprising the fibers which extend in the longitudinal direction.

SUMMARY OF THE INVENTION

An aspect of the invention is a snow sliding board which exhibits improved handling characteristics and a low weight.

One aspect of the invention relates to a sliding board, preferably a snow sliding board. The snow sliding board comprises: a front sliding board region which comprises a front end of the sliding board; a rear sliding board region which comprises a rear end of the sliding board; and a binding region, extending between the front sliding board region and the rear sliding board region in the longitudinal direction of the sliding board, for fixing a sliding board binding for holding a boot. The snow sliding board exhibits a multi-layered structure comprising at least: a sliding board core; one or more upper layer(s) which is/are arranged above the sliding board core; and one or more lower layer(s) which is/are arranged below the sliding board core. An upper layer and/or a lower layer comprises a fiber-composite material, wherein at least a portion of the fiber-composite material exhibits a fiber orientation which varies within the portion.

The fiber-composite material can in particular be a long-fiber product, wherein the long fibers exhibit anisotropic characteristics, i.e. the maximum mechanical characteristics such as strength and stiffness are only present or can only be achieved in the longitudinal direction of the fibers. If there are differences between the direction of stress and the fiber alignment, the pronounced unidirectional mechanical characteristics are very significantly reduced. In the fiber-composite material described here, the fibers are therefore arranged or aligned such that they reflect, as exactly as possible, the lines of force acting locally on the snow sliding board in its utilization phase.

The portion can be a region in the fiber-composite material or fiber-composite material structure, the extent of which is clearly defined and can preferably be clearly seen with the eye, and which adjoins at least one other region which has a different fiber orientation and preferably also a different optical appearance. The portion can for example be formed by one of the sliding board regions or can be part of at least one of the sliding board regions. The portion can for example be the front or rear sliding board region. If the fiber-composite material or fiber-composite material structure extends over the entire sliding board, the sliding board as a whole forms the portion.

The fibers of the fiber-composite material can be fibers made of carbon, glass, aramid, stone (for example, basalt), natural yarn, natural fibers (for example, bamboo), synthetic fibers (for example, aramids), plastic (such as thermoplastics), ceramics, textiles or also metal (for example, steel or copper wire). Other suitable materials, not explicitly mentioned here, also fall within the scope of this application, i.e. this list is not exhaustive. One or more rovings can be used instead of or in addition to the fibers, wherein "roving" denotes a bundle or strand of fibers, arranged in parallel, a mesh of fibers and a cord of fibers. An individual roving can consist of numerous identical fibers or of a mixture of different fibers which can be individually assembled in order for example to design a roving with very specific characteristics such as elasticity, hardness, torsional ability, etc.

A "fiber-composite material" is to be understood here to mean a composite material in which one or more fibers/rovings is/are embedded in a matrix made of a substrate material or in which the fiber(s) or roving(s) is/are connected to a base material and optionally embedded in a substrate material. The composite material can also comprise fibers and rovings. It holds throughout the description that the statements made with respect to the fibers also apply analogously to the rovings and vice versa, unless explicitly stated otherwise. The base material can be a lower laminate or upper laminate of the snow sliding board or a fleece or fabric to which the fibers are connected. The "substrate material" denotes for example a resin or plastic which at least partially surrounds the fibers, such that the fibers form a mat-like or plate-like structure in conjunction with the resin or plastic. The base material, the substrate material, the fibers and/or the rovings are preferably solid at standard temperature and can be placed in a deformable state, for example by being heated, in which it is possible to deform the fiber-composite material without it breaking.

The fibers can be placed or laid onto the base material and fixed in a laying and stitching method, preferably placed and fixed automatically by means of a corresponding device. They can be fixed by connecting the fiber to the base material after or immediately after it has been laid, using an additional thread. They can be placed automatically by a preferably programmable placing device. The program predefines a placing pattern for the fiber which can be individually drawn up for different products on a computer. The placing device can comprise a magazine for a continuous fiber and/or a continuous roving, and a cutting device for severing the fiber at the end of a placing step. The thread can pierce the fiber and the base material in order to fix the fiber on the base material or, as is preferred, connect it to the base material by means of a loop, without then piercing the material of the fiber but preferably piercing the base material. The laying and stitching method can in particular be a tailored fiber placement (TFP) method.

The thread can likewise be formed from one or more fibers which exhibit the necessary flexibility in order to be used as a stitching thread. The thread can then be made of a material which forms a part of a substrate material for the placed fiber or roving, or made of a material which further improves the characteristics of the fiber-composite material. If a fiber or roving is to be additionally embedded in a substrate material after it has been placed and fixed on the base material, then individual fibers can be formed from a material which forms or at least forms part of this substrate material, for example after the fiber-composite material has been heat-treated.

The placing pattern can comprise numerous short fibers and/or rovings which are arranged next to each other and/or one above the other. Fibers arranged next to each other can extend parallel to each other or can for example spread apart or come together in a V shape from a common point or baseline which is for example formed by a first end of the fibers, and the ends opposite the first ends can for example extend up to an outer periphery of the fiber-composite material. Other fibers can extend in the direction of a longitudinal axis of the fiber-composite material; yet others can for example extend transverse to the longitudinal axis. The regions of the fiber-composite material comprising differently aligned fibers can be clearly separated from each other or can overlap only slightly.

In relation to the snow sliding board, this can mean that the fibers are arranged substantially radially in a front sliding board region or paddle region, aligned for example substantially transverse to the longitudinal direction of the sliding board and/or parallel to the longitudinal direction of the sliding board in the binding region, and aligned substantially perpendicular to the outer edges of the rear end or again radially in a rear sliding board region or rear end region. Other arrangements are possible and can be freely selected, since the method allows any alignment of each of the individual fibers. The fibers can also be laid in the shape of a grid, at least in the front and/or rear sliding board region, such that they for example form diamond shapes in a plan view onto the surface of the ski.

Another arrangement of the fibers can for example be in a fishbone shape, beginning at or in the binding region and comprising a "main bone" or main strand which extends in the middle of the sliding board, i.e. in the middle between the two outer peripheries of the sliding board in a plan view onto the sliding board, towards the front and/or rear end of the sliding board, starting from the binding region. Numerous secondary strands can branch off from this main strand and extend at varying angles towards the front and/or rear end of the sliding board, wherein the number of secondary strands extending next to each other can increase as the distance from the binding region increases. The fibers of the secondary strands can each extend up to one of the lateral edges of the sliding board, where they preferably terminate. Additionally, other fibers can extend from the front and/or rear end of the sliding board towards the binding region. These other fibers can be two independent fiber strands which are arranged mirror-inverted along a central longitudinal axis of the sliding board and do not extend in the region of the aforementioned main strand. These fibers can likewise extend at different angles from the respective end of the sliding board up to an outer periphery of the sliding board. These other fibers are preferably present only in at least one of the regions of the sliding board which extend between the respective end of the sliding board and the binding region without extending up to or into the binding region. The fibers of the main strand and secondary strands are preferably formed from the same material and serve to reinforce the sliding board and imbue it with desired characteristics. The other fibers in the respective end region of the sliding board can be formed from a different material and locally influence the properties of the sliding board. The course of the fibers described can be individually adapted to the handling characteristics of in particular top athletes and ambitious amateur athletes, in order to optimize their performance. To this end, it is necessary to take corresponding measurements on the sliding board in a test rig or on the slopes. The individual course of the fibers can then be calculated from these measurements, in order to provide optimum sports equipment.

The pattern can alternatively be formed from a few or a single continuous fiber and/or roving, i.e. the respective fiber can extend in a meandering or looping shape in a plan view onto the snow sliding board. A loop comprises a loop arc or bight which can adjoin the loop arc or bight of another loop, resulting for example in an undulating pattern. At least one end and preferably both ends of the loop arc can transition into a longitudinal portion of the loop, such that the loop exhibits a U shape or similar shape. The pattern can comprise inner loop arcs and outer loop arcs, wherein at least in the front sliding board region, the inner loop arcs are generally nearer to a longitudinal center axis of the snow sliding board than the outer loop arcs which preferably extend up to or near to an outer edge of the snow sliding board. Multiple loops can also lie within each other, i.e. one outer loop and one or more inner loops within the outer loop.

The loops can be elongated and have longitudinal portions extending in a longitudinal direction of the loops. The longitudinal portions of the loops can be substantially linear, such that the longitudinal portions of a loop extending in the longitudinal direction of the loop extend substantially parallel to each other. Alternatively, the longitudinal portions of a loop can be aligned towards or away from each other. The longitudinal portions of the loops can be arc-shaped, i.e. can extend in the shape of an arc in the longitudinal direction of the loops. The reinforcing structure can comprise loops or bights and/or loops comprising bights and linear longitudinal portions of the loops and/or loops comprising bights and arc-shaped longitudinal portions of the loops and/or loops comprising bights and linear and arc-shaped longitudinal portions of the loops. Individual longitudinal portions of the loops can also be laid in a zigzag shape, a Z shape, a meandering shape, an undulating shape or a spiral shape or can exhibit another shape using which specific, locally required characteristics of the snow sliding board can be optimally assisted or optimized. The above statements apply correspondingly to the arrangement and alignment of the loops, in particular the longitudinal portions of the loops. The direction of the longitudinal portions of the loops and/or a distance between longitudinal portions of the loops which lie adjacently next to each other can thus be varied in the longitudinal direction of the sliding board. It is thus for example possible to provide a torsional reinforcement in each of the front sliding board region and rear sliding board region and a longitudinal reinforcement in the binding region.

The longitudinal direction of the loops can point at an inclination angle to a central longitudinal axis of the snow sliding board in the front sliding board region and/or rear sliding board region, wherein the inclination angle is preferably equal to or greater than 0° and equal to or smaller than 90°. The inclination angle $\alpha$ can preferably vary in the longitudinal direction of the sliding board. The inclination angle can thus increase in the longitudinal direction of the sliding board, starting from the front end and/or rear end of the sliding board. The inclination angle can likewise increase in the longitudinal direction of the sliding board, starting from the binding region. The inclination angle at the front end and/or rear end of the sliding board can be smaller than 20° or smaller than 10°.

The fiber-composite material can have an area which corresponds to the area of a lower laminate or upper laminate or another layer of the layered structure of the snow sliding board. The fiber-composite material can alternatively form a frame which reinforces the snow sliding board, in particular in the front sliding board region or paddle region and/or in the rear sliding board region or rear end region and optionally in the binding region, in order to increase the torsional stiffness in this/these region(s), i.e. the fiber-composite material can form a reinforcing frame which locally reinforces the snow sliding board, preferably in a targeted way.

In other words, the fiber(s)/roving(s) can extend, in a plan view, in a left-hand side limb of the reinforcing frame extending in the longitudinal direction of the sliding board, in a right-hand side limb of the reinforcing frame extending in the longitudinal direction of the sliding board, and in at least one transverse limb of the reinforcing frame extending transverse to the longitudinal direction of the sliding board and connecting the side limbs, and the side limbs can exhibit a limb distance from each other transverse to the longitudinal direction of the sliding board outside of the transverse limb, such that a central portion of the snow sliding board between the side limbs does not comprise the fiber-composite material.

The reinforcing frame can be a substantially flat body which for example forms part of a layer of the snow sliding board together with a non-reinforced base material, wherein it does not however protrude beyond an outer side of the finished snow sliding board and does not comprise any lateral bending edges which are for example aligned obliquely or perpendicular to a surface of the snow sliding board. An overall area in a plan view onto the reinforcing frame is smaller, preferably many times smaller, than a corresponding overall area of the sliding board or a layer of material which forms part of the sliding board. This has a positive effect on the overall weight of the sliding board.

The side limbs of the reinforcing frame are spaced from each other transverse to the longitudinal direction of the snow sliding board; in other words, they exhibit a limb distance from each other transverse to the longitudinal direction of the sliding board. The right-hand side limb can have a width, transverse to the longitudinal direction of the sliding board, which is smaller than the limb distance. The same applies to the left-hand side limb. The width of the right-hand side limb can preferably be equal to the width of the left-hand side limb. A sum of the width of the left-hand side limb and the width of the right-hand side limb in any sectional line transverse to the longitudinal direction of the snow sliding board can be equal to, greater than or smaller than the limb distance in at least most of the reinforcing frame.

The side limb distance can be constant over at least most of the length of the reinforcing frame. The width of the right-hand side limb and the width of the left-hand side limb can decrease, preferably continuously, from a front end of the paddle region or, respectively, the transverse limb formed on it, towards the binding region.

The left-hand side limb can extend along the left-hand side periphery of the snow sliding board, starting from the transverse limb; the right-hand side limb can extend along the right-hand side periphery of the snow sliding board, starting from the transverse limb. In a plan view onto the reinforcing frame, the transverse limb can form the tip of the paddle region of the snow sliding board or the rear end of the snow sliding board.

The left-hand side limb and the right-hand side limb preferably extend towards the binding region, starting from the transverse limb, at most up to or into the binding region. The binding region or binding fixing region of the snow sliding board extends in the longitudinal direction of the snow sliding board up to and below a front jaw and up to and below a rear jaw of the sliding board binding fixed on the snow sliding board, i.e. the right-hand side limb and the left-hand side limb can terminate in front of or at the beginning of the binding region in the longitudinal direction of the snow sliding board, as viewed from the transverse limb.

The reinforcing frame can consist of at least a first or front reinforcing frame part for the front sliding board region and a second or rear reinforcing frame part for the rear sliding board region. The front reinforcing frame part and the rear reinforcing frame part are preferably not connected to each other. The two reinforcing frame parts also do not contact each other, such that the weight of the split reinforcing frame is again reduced as compared to a circumferential reinforcing frame.

One or both of the reinforcing frame parts can be substantially horseshoe-shaped or U-shaped, wherein the open ends of the horseshoe-shaped front reinforcing frame part and the open ends of the horseshoe-shaped rear reinforcing frame part lie opposite each other on the snow sliding board in the longitudinal direction of the snow sliding board.

If the snow sliding board has a multi-layered structure, the front reinforcing frame part and the rear reinforcing frame part can form a layer of their own, be assigned to a single layer, or be assigned to different layers.

An extent of the front reinforcing frame part in the longitudinal direction of the snow sliding board can be greater than an extent of the rear reinforcing frame part in the longitudinal direction of the snow sliding board, and vice versa.

The reinforcing frame can have a multi-layered structure and can for example comprise a layer made of a light metal or light metal film, such as TITANAL® aluminum alloy, and a layer made of the fiber-composite material. The light metal film can comprise a multitude of bores through which the thread for fixing the fiber or roving can be guided, i.e. the light metal film can form the base material for the TFP method, to which the fiber or roving is connected as already described. The layer made of light metal can be enveloped by or embedded in the fiber-composite material or vice versa, wherein the layer made of light metal and the layer made of the composite material can exhibit different shapes or contours, only regions of which overlap, such that the finished reinforcing frame comprises regions which only comprise light metal, regions which are formed solely by the fiber-composite material, and regions which are formed from the light metal and the fiber-composite material. It will be readily understood that the statements made with respect to the metal film also apply to any other film or plate material selected by the person skilled in the art as a base material for a specific use.

The core can be a wood core which can comprise a reinforcement made for example of a fiberglass.

If the reinforcing frame or the fiber-composite material does not cover the binding region which, as already described, can be arranged between the front reinforcing frame part and the rear reinforcing frame part in the longitudinal direction of the snow sliding board, a reinforcing plate—for example, a light metal plate or fiber-composite material plate—can be additionally arranged in the binding region, for example above the core and below a first upper laminate, for reinforcing purposes. This reinforcing plate can exhibit a thickness which is smaller than or equal to the thickness of the reinforcing frame or light metal frame. Preferably, the reinforcing frame and the reinforcing plate do not overlap or only slightly overlap in a plan view from above onto the snow sliding board.

The front paddle region and the rear end region of the sliding board can additionally comprise a light carbon material, in order to achieve the necessary torsional stiffness while keeping the overall weight of the sliding board low. The snow sliding board can be a sliding board which has the shape of an elongated W in a side view in the longitudinal direction of the sliding board; in other words, a sliding board which from the front end or the rear end has a convex curve, followed by a concave curve, followed by a convex curve (rocker/camber/rocker), wherein for the purposes of the application, "convex" means that an apex of the convex arch or curve lies on a flat plane when a sliding board is lying on said plane, while an apex of the concave arch or curve is spaced from the contact area. The concave region on the sliding board can be formed in the region below the binding. A midsection is generally also formed in the concave region of the sliding board.

The layer comprising or made of the fiber-composite material can lie directly below an upper layer of the snow sliding board which forms the surface of the snow sliding board. At least regions of this upper layer can be transparent, such that the pattern of the fiber is visible and can be used as a design element. The layer comprising the composite material can also form the surface of the sliding board itself, which is for example coated in a preferably hammer-proof clear varnish for protection purposes. The uppermost layer which forms the surface of the snow sliding board can be printed on.

The upper side of the snow sliding board can have an upwardly projecting, raised upper side portion which extends from the binding region up to or into the front sliding board region and/or from the binding region up to or into the rear sliding board region. The fiber-composite material or the reinforcing frame can be arranged next to and/or in front of and/or behind the raised upper side portion in a plan view. The raised upper side portion can project upwards beyond the fiber-composite material.

Another aspect of the invention relates to a layer for a snow sliding board which forms a snow sliding board body together with other layers and a core and other parts. The layer consists of a fiber-composite material and comprises at least one portion in which the fiber-composite material exhibits a fiber orientation which varies within the portion. The portion is preferably a region in the fiber-composite material or fiber-composite material layer, the extent of which is clearly defined and can preferably be clearly seen with the eye. This region can adjoin at least one other region which has a different fiber orientation and preferably also a different optical appearance. The portion can for example be formed in a front and/or rear region in the longitudinal direction of the layer and/or in a middle region between the front region and the rear region. The fiber-composite material can comprise a base material onto which fibers and/or rovings are placed and to which the fibers and/or rovings are connected. Preferably, the fibers and/or rovings are placed and connected, i.e. the fiber-composite material or at least a precursor of the fiber-composite material is manufactured, by means of a laying and stitching (TFP: tailored fiber placement) method. The fiber-composite material can in particular be the fiber-composite material described with respect to the first aspect.

The fiber-composite material can form a reinforcing frame such as has been described with respect to the first aspect. In general, it holds that all the features which have been described with respect to the subject-matter of the first aspect, in particular in relation to the fiber-composite material, also apply to the subject-matter of the second aspect, and vice versa.

The following additional aspects are worded in the manner of claims and can substitute for the claims or be adduced in order to enhance them.

Aspect 1 A sliding board, preferably a snow sliding board, comprising:
- 1.1 a front sliding board region (A) which comprises a front end of the sliding board;
- 1.2 a rear sliding board region (C) which comprises a rear end of the sliding board;
- 1.3 a binding region (B), extending between the front sliding board region (A) and the rear sliding board region (C) in the longitudinal direction (X) of the sliding board, for fixing a sliding board binding for holding a boot;
- 1.4 a first layer (lower laminate, core, upper laminate, etc.) and a second layer (for example, a top layer) which are arranged one above the other;
- 1.5 and a thread material which is arranged on the first layer and fixed relative to the first layer in order to form a reinforcing structure (20) which is reinforced by the thread material,
- 1.6 wherein the thread material comprises one or more threads, and the respective thread extends in loops (26) which lie next to each other in a plan view onto the first layer.

Aspect 2 The snow sliding board according to Aspect 1, wherein the respective thread extends in a meandering shape in a plan view.

Aspect 3 The snow sliding board according to any one of the preceding aspects, wherein the thread material is laid on the first layer and fixed in a tailored fiber placement method.

Aspect 4 The snow sliding board according to any one of the preceding aspects, wherein the loops (26) are each elongated and each comprise longitudinal portions extending in a longitudinal direction ($X_S$) of the loops.

Aspect 5 The snow sliding board according to any one of the preceding aspects, wherein at least some of the loops (26) comprise linear longitudinal portions (27) which each extend in a longitudinal direction ($X_S$) of the loops.

Aspect 6 The snow sliding board according to any one of the preceding aspects, wherein at least some of the loops (26) comprise longitudinal portions (27) which each extend in the shape of an arc in a longitudinal direction ($X_S$) of the loops.

Aspect 7 The snow sliding board according to any one of the immediately preceding three aspects, wherein the longitudinal direction ($X_S$) of the loops and/or a distance between longitudinal portions (27) of the loops which lie adjacently next to each other varies in the longitudinal direction (X) of the sliding board, such that a torsional reinforcement in each of the front sliding board region (A) and rear sliding board region (C) and a longitudinal reinforcement in the binding region (B) is formed.

Aspect 8 The snow sliding board according to any one of the immediately preceding four aspects, wherein the longitudinal direction ($X_S$) of the loops points at an inclination angle α to a central longitudinal axis ($X_A$) of the snow sliding board in the front sliding board region (A) and/or rear sliding board region (C), wherein 0° a 90°.

Aspect 9 The snow sliding board according to the preceding aspect, wherein the inclination angle α varies in the longitudinal direction (X) of the sliding board.

Aspect 10 The snow sliding board according to the preceding aspect, wherein the inclination angle α increases in the longitudinal direction (X) of the sliding board, starting from the front end and/or rear end of the sliding board.

Aspect 11 The snow sliding board according to the preceding aspect, wherein the inclination angle α at the front end and/or rear end of the sliding board is smaller than 20° or smaller than 10°.

Aspect 12 The snow sliding board according to any one of Aspects 7 to 9, wherein the inclination angle α increases in the longitudinal direction (X) of the sliding board, starting from the binding region (B).

Aspect 13 The snow sliding board according to any one of Aspects 3 to 10, wherein at the front and/or rear end of the sliding board, the longitudinal portions (27) of the loops extend radially, in a plan view, towards an outer periphery of the snow sliding board, starting from inner loop arcs (28).

Aspect 14 The snow sliding board according to any one of Aspects 3 to 11, wherein the inner ends of the longitudinal portions (27) of the loops facing a central longitudinal axis ($X_A$) of the sliding board are connected by inner loop arcs (28), and the outer ends of the longitudinal portions (27) of the loops facing away from the central longitudinal axis ($X_A$) of the sliding board are connected by outer loop arcs (29).

Aspect 15 The snow sliding board according to the preceding aspect, wherein the inner loop arcs (28) each exhibit a distance (½·y) from the central longitudinal axis ($X_A$) of the sliding board, transverse to the longitudinal direction (X) of the sliding board.

Aspect 16 The snow sliding board according to any one of Aspects 3 to 13, wherein a distance between longitudinal portions (27) of the loops which lie adjacently next to each other varies in the longitudinal direction (X) of the sliding board.

Aspect 17 The snow sliding board according to the preceding aspect, wherein the distance decreases towards the front end of the sliding board and/or towards the rear end of the sliding board.

Aspect 18 The snow sliding board according to any one of the preceding aspects, wherein the thread material comprises multiple threads or thread portions which extend next to each other, at least substantially in the longitudinal direction (X) of the sliding board, in the binding region (B).

Aspect 19 The snow sliding board according to any one of the preceding aspects, wherein:
the respective thread extends, in a plan view, in a left-hand side limb (21) extending in the longitudinal direction (X) of the sliding board, in a right-hand side limb (22) extending in the longitudinal direction (X) of the sliding board, and in a transverse limb (23 or 24) extending transverse to the longitudinal direction (X) of the sliding board and connecting the side limbs; and
the side limbs (21, 22) exhibit a limb distance (y) from each other transverse to the longitudinal direction (X) of the sliding board outside of the transverse limb, such that a central portion of the snow sliding board between the side limbs does not comprise the thread.

Aspect 20 The snow sliding board according to any one of the preceding aspects, wherein:
the reinforcing structure (20) comprises, in a plan view, a left-hand side limb (21) extending in the longitudinal direction (X) of the sliding board, a right-hand side limb (22) extending in the longitudinal direction (X) of the sliding board, and a transverse limb (23 or 24) extending transverse to the longitudinal direction (X) of the sliding board and connecting the side limbs; and
the side limbs (21, 22) exhibit a limb distance (y) from each other transverse to the longitudinal direction (X) of the sliding board outside of the transverse limb (23 or 24), such that a central portion of the snow sliding board between the side limbs does not comprise the reinforcing structure (20).

Aspect 21 The snow sliding board according to any one of the immediately preceding two aspects, wherein the side limbs (21, 22), the transverse limb (23 or 24), and another transverse limb (24 or 23) of the reinforcing structure (20) form a reinforcing frame which in a plan view surrounds a central portion of the snow sliding board extending from the front sliding board region (A) up to and into the rear sliding board region (C).

Aspect 22 A snow sliding board, preferably according to any one of the preceding aspects, comprising:
a front sliding board region (A) which comprises a front end of the sliding board;
a rear sliding board region (C) which comprises a rear end of the sliding board;
a binding region (B), extending between the front sliding board region (A) and the rear sliding board region (C) in the longitudinal direction (X) of the sliding board, for fixing a sliding board binding for holding a boot;
a core (1);
an upper laminate (2);
a lower laminate (3); and
a reinforcing structure (10) extending in the paddle region (A) and/or in the rear end region (C) and manufactured by means of a TFP method.

Aspect 23 The snow sliding board according to any one of the preceding aspects, wherein the reinforcing structure (12) forms a reinforcing frame which comprises, in a plan view, a left-hand side limb (21) extending in the longitudinal direction (X) of the sliding board, a right-hand side limb (22) extending in the longitudinal direction (X) of the sliding board, and a transverse limb (23 or 24) extending transverse to the longitudinal direction (X) of the sliding board and connecting the side limbs (21, 22).

Aspect 24 The snow sliding board according to the preceding aspect, wherein the transverse limb (23) extends either in the front sliding board region (A), preferably at the front end of the sliding board, or in the rear sliding board region (C), preferably at the rear end of the sliding board.

Aspect 25 The snow sliding board according to any one of the immediately preceding two aspects, wherein the side limbs (21, 22) exhibit a limb distance (y) from each other transverse to the longitudinal direction (X) of the sliding board.

Aspect 26 The snow sliding board according to any one of the preceding aspects, comprising:
- a raised portion which projects upwards on an upper side of the snow sliding board and extends from the binding region (B) up to or into the front sliding board region (A) and/or from the binding region (B) up to or into the rear sliding board region (C),
- wherein the reinforcing structure (12) comprises, in a plan view, a left-hand side limb (21) extending in the longitudinal direction (X) of the sliding board next to the raised portion, a right-hand side limb (22) extending in the longitudinal direction (X) of the sliding board next to the raised portion, and optionally a transverse limb (23 or 24) extending transverse to the longitudinal direction (X) of the sliding board and connecting the side limbs; and
- the raised portion projects upwards beyond the reinforcing structure (12).

Aspect 27 The snow sliding board according to the preceding aspect in combination with Aspect 1, wherein the thread material is arranged in the front sliding board region (A) and/or in the rear sliding board region (C) on the left and right next to the raised portion and preferably surrounds the raised portion, and the raised portion projects upwards beyond the thread material.

Aspect 28 The snow sliding board according to any one of Aspects 19 to 21 and 25 to 27, wherein the side limbs (21, 22) each have a width transverse to the longitudinal direction (X) of the sliding board which is smaller than the limb distance (y).

Aspect 29 The snow sliding board according to any one of Aspects 19 to 21 and 25 to 28, wherein the limb distance (y) is constant over at least most of the length of the reinforcing structure (10; 20).

Aspect 30 The snow sliding board according to any one of Aspects 19 to 21 and 25 to 29, wherein the side limbs (21, 22) each have a width transverse to the longitudinal direction (X) of the sliding board which decreases, preferably continuously, towards the binding region (B).

Aspect 31 The snow sliding board according to any one of Aspects 19 to 21 and 25 to 30, wherein the left-hand side limb (21) extends along the left-hand side periphery of the snow sliding board, starting from the transverse limb, and the right-hand side limb (22) extends along the right-hand side periphery of the snow sliding board, starting from the transverse limb.

Aspect 32 The snow sliding board according to any one of Aspects 19 to 21 and 25 to 31, wherein the transverse limb (23 or 24) forms the front end of the sliding board or the rear end of the sliding board in a plan view onto the reinforcing structure (12).

Aspect 33 The snow sliding board according to any one of Aspects 19 to 21 and 25 to 32, wherein the side limbs (21, 22) extend towards the binding region (B), starting from the transverse limb (23 or 24), at most up to or into the binding region (B), wherein the binding region (B) preferably extends in the longitudinal direction (X) of the sliding board up to and below a front jaw and rear jaw of the sliding board binding when the sliding board binding is fixed.

Aspect 34 The snow sliding board according to the preceding aspect, wherein the side limbs (21, 22) terminate axially in front of the binding region (B), as viewed from the transverse limb (23 or 24).

Aspect 35 A snow sliding board constructed from multiple components connected to each other,
wherein at least one of the components comprises a substrate material and a reinforcing material which is connected to the substrate material,
wherein the reinforcing material is placed onto the substrate material and connected to the substrate material by means of a laying and stitching method.

Aspect 36 The snow sliding board according to the preceding aspect, wherein the reinforcing material comprises at least one continuous roving and/or fiber which is/are preferably placed and fixed on the substrate material in a looped shape, or one or more separate rovings and/or fibers which is/are placed and fixed on the substrate material, made of a single material or different materials.

Aspect 37 The snow sliding board according to the preceding aspect, wherein a roving is a composite of numerous fibers, wherein the fibers of the roving are formed from a single material or different materials.

Aspect 38 The snow sliding board according to any one of the preceding two aspects, wherein individual rovings and/or fibers form part of the substrate material for the other rovings and/or fibers of the at least one finished component.

Aspect 39 The snow sliding board according to any one of the preceding three aspects, wherein the rovings and/or fibers can be placed on the substrate material in a freely selectable geometry.

Aspect 40 The snow sliding board according to any one of the preceding aspects, wherein the angles between adjacent rovings or fibers vary over the course of the snow sliding board.

Aspect 41 The snow sliding board according to the preceding aspect, wherein rovings or fibers extend, at least in regions of the at least one component, from an outer edge of the snow sliding board, for example in the paddle region and/or end region, substantially via the shortest route in a straight line towards a central longitudinal axis of the snow sliding board.

Aspect 42 The snow sliding board according to any one of the preceding aspects, wherein the substrate material is an upper laminate and/or a lower laminate.

Aspect 43 The snow sliding board according to any one of the preceding aspects, wherein component regions of components comprising the reinforcing material placed by means of a laying and stitching method are arranged next to each other and/or overlapping.

Aspect 44 The snow sliding board according to any one of the preceding aspects, wherein the reinforcing material is rovings and/or threads made of carbon, glass, aramid, stone (for example, basalt), natural fiber (for example, bamboo), plastic (for example, thermoplastics), ceramics, textiles, or metal.

Aspect 45 The snow sliding board according to any one of the preceding aspects, wherein stitching threads used in the laying and stitching method, using which the rovings and/or fibers are fixed on the substrate material, consist of a material which in part influences characteristics of the component, such as for example the elasticity, strength, hardness, etc. of the component, in the finished snow sliding board or which is part of the substrate material in the finished snow sliding board.

Aspect 46 The snow sliding board according to any one of the preceding aspects, wherein the at least one component also comprises a material, such as for example a synthetic resin, in which the rovings and/or fibers are embedded.

Aspect 47 The snow sliding board according to any one of the preceding seven aspects, wherein the at least one component forms a frame which forms at least part of at least the paddle region and/or end region of the snow sliding board.

Aspect 48 The snow sliding board according to the preceding aspect, wherein the frame comprises a first part for the paddle region and a second part for the end region, and wherein the first part and the second part are preferably not connected to each other.

Aspect 49 The snow sliding board according to the preceding aspect, wherein the first part and/or the second part are substantially horseshoe-shaped, wherein the open end of the horseshoe-shaped first part and the open end of the horseshoe-shaped second part lie opposite each other on the snow sliding board.

Aspect 50 The snow sliding board according to any one of the preceding aspects, wherein the at least one component forms an upper side of the snow sliding board or is arranged below a transparent or opaque other component.

Aspect 51 The snow sliding board according to the preceding aspect, wherein a visible surface of the at least one component is embodied to be able to be printed on.

BRIEF DESCRIPTION OF THE DRAWINGS

In the following, example embodiments of the invention are described in more detail on the basis of figures. Features essential to the invention which can only be gathered from the figures form part of the scope of the invention and can advantageously develop the invention, individually or in combinations shown.

The figures show.

DETAILED DESCRIPTION OF THE INVENTION

Figure 1:
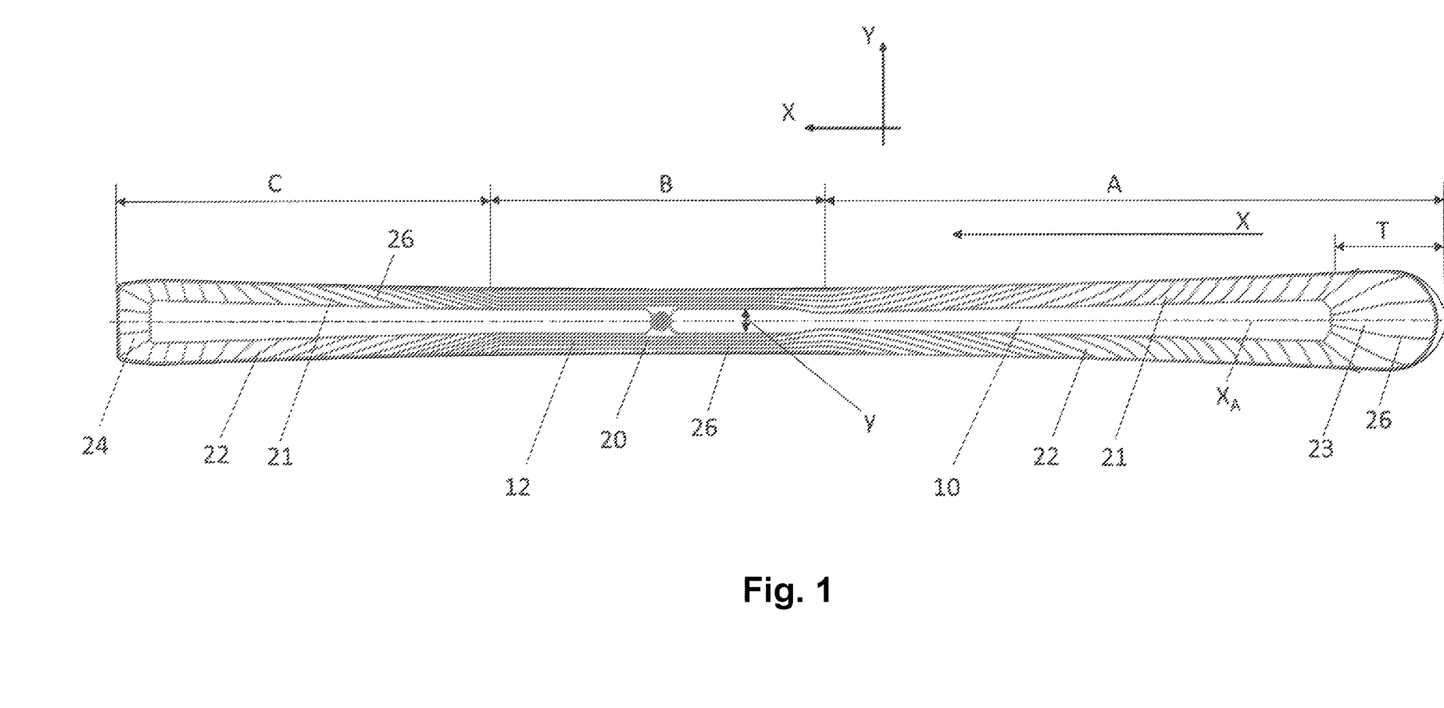
FIG. 1 an example embodiment of a snow sliding board comprising a reinforcing structure.

FIG. 1 shows a sliding board in a plan view from above. The sliding board comprises: a front sliding board region A which comprises a paddle T; a rear sliding board region C which comprises a rear end of the sliding board; and a binding region B which is arranged between the front sliding board region A and the rear sliding board region C. The binding region B is designed to be able to accommodate a sliding board binding (not shown). At least regions of the binding region B can project upwards out of the sliding board, such that an area of the binding region B on which the binding can be fitted protrudes perpendicularly upwards beyond an average height of the surface of the sliding board outside of the paddle T.

The sliding board or, respectively, the upper layer of the sliding board which can be seen in the plan view comprises a reinforcing structure 12 which comprises one or a multitude of fibers and/or rovings 20 which are connected to a base material 10 such that they cannot move relative to said base material 10. Rovings 20 are understood to mean a bundle of fibers 20, wherein the bundle can consist of fibers 20 made of a single material or fibers 20 of different materials.

The fibers 20 or rovings 20 can be fused to the base material 10 and/or glued and/or sewn onto the base material 10 in order to form the reinforcing structure 12. The fibers 20 or rovings 20 can preferably be placed onto the base material 10 by means of a TFP method and fixed on the base material 10 using a stitching technique. The fibers 20 or rovings 20 can then be fixedly connected to the base material 10 in subsequent processing, such that the fibers 20 or rovings 20 can no longer be detached from the base material 10 without being destroyed. They can be connected in this way for example by being heated and/or pressed as the snow sliding board is produced. Said reinforcing structure 12 is then effectively provided as a semi-finished product which already exhibits the dimensions for subsequent processing in the snow sliding board or firstly still has to be cropped to said dimensions.

In the following, the reinforcing structure 12 is mostly described on the basis of the fibers 20 in order to keep the text easy to read. It is however explicitly noted that the statements made with respect to the fibers 20 also apply analogously to the rovings 20, and that a reinforcing structure 12 can comprise fibers 20 or rovings 20 or fibers 20 and rovings 20.

FIG. 1 shows how the fibers 20 which form the reinforcing structure 12 can be arranged at any angle relative to the snow sliding board or to the longitudinal axis $X_A$ of the snow sliding board. In the example embodiment, for example, the fibers 20 extend radially apart in the region of the paddle T. Behind the paddle T in the longitudinal direction X of the snow sliding board, the fibers 20 in the front sliding board region A initially extend substantially transverse to the longitudinal axis $X_A$ of the snow sliding board and parallel to each other; in front of the binding region B, the fibers 20 extend obliquely and substantially parallel to each other.

The course or alignment of the fibers and/or rovings 20 can vary within a region, wherein the fibers and/or rovings 20 can cross each other, i.e. lie one above the other at least at points. The fibers and/or rovings 20 can also lie one above the other in multiple layers, wherein each of the layers in and of itself can exhibit a uniform alignment of the fibers and/or rovings 20, and the alignments of layers lying one above the other are different. The layers can overlap completely or only partially in the region, such that for example an outer peripheral region of the snow sliding board can be additionally reinforced due to the prevalent mechanical loads applied at said region.

In the binding region B, the fibers 20 extend parallel to the longitudinal axis $X_A$ of the snow sliding board (see FIG. 2) and lie close to each other in the example embodiment.

Behind the binding region B, the fibers 20 are then initially oblique with respect to the longitudinal axis $X_A$ of the snow sliding board again and extend substantially parallel to each other. Subsequent to this, the fibers 20 are again substantially transverse to the longitudinal axis $X_A$ of the snow sliding board and parallel to each other. At the rear end, the fibers 20 extend parallel to the longitudinal axis $X_A$ of the snow sliding board again.

The fibers 20 can be numerous short fibers 20 which are laid individually in order to obtain the pattern shown. Instead of numerous short fibers 20, it is also possible to use continuous fibers which are placed onto the base material 10 such that they depict the desired pattern. Using continuous fibers and/or continuous rovings has the advantage that the placing process during the manufacture of the reinforcing structure 12 does not have to be constantly interrupted and restarted but can rather be performed continuously. This saves time and therefore cost. If the desired pattern cannot be directly depicted in this way, the area of the base material 10 is dimensioned such that the base material 10 which is populated with the fibers and/or rovings 20 can subsequently be cropped to a processing size, such that the cropped piece then exhibits the desired pattern.

In the example embodiment, the fibers 20 form a frame-shaped reinforcing structure 12 on the base material 10, comprising middle regions with no fibers and/or rovings 20. The reinforcing structure 12 comprises a first side limb 21, a second side limb 22, a first transverse limb 23 and a second transverse limb 24. The fibreless region can comprise the base material 10; in principle, however, the reinforcing structure 12 can also comprise no base material 10 in the fibreless region. The fibers 20 also need not form a closed frame, as shown, but can form separate reinforcing structure parts 14, 15 (see FIG. 3) which reinforce the snow sliding board only locally, for example a first reinforcing structure part 14 in the region of the front sliding area A and the paddle T, and a second reinforcing structure part 15 in the region of the rear sliding area C. In this case, the binding region B can comprise no reinforcing structure 12 featuring the fibers 20 and/or can comprise a separate reinforcing structure which is not connected to either the first reinforcing structure part 14 or the second reinforcing structure part 15.

Instead of the frame structure shown by way of example, the reinforcing structure 12 can also comprise multiple planar partial structures which can for example be constructed skeletally in order to keep the weight of the snow sliding board as low as possible. If there are multiple separate reinforcing structure parts 14, 15, whether as a frame or in another shape, each reinforcing structure part 14, 15 can comprise a fiber material which is different from another reinforcing structure part 14, 15. The fibers 20 used can be adapted to the individual requirements of the respective reinforcing structure part 14, 15.

Figure 2:
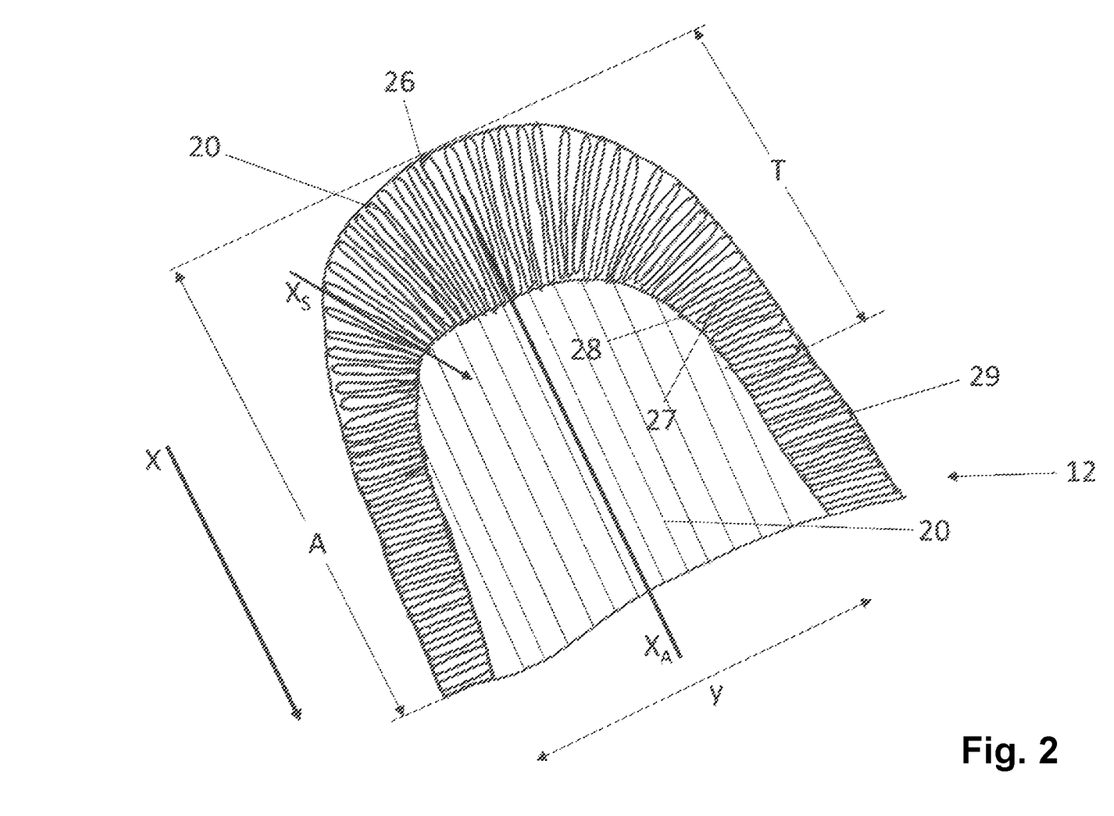
FIG. 2 a freehand sketch of a front sliding board region comprising a fiber-reinforcing structure.

FIG. 2 shows a freehand sketch of a front sliding board region A comprising the paddle T. This shows how the fiber 20 has been laid in loops 26 in an outer region, wherein each of the loops 26 comprises at least one longitudinal portion 27 in the longitudinal direction $X_S$ of the loops. Each two adjacent longitudinal portions 27 of the loops are connected to each other by an inner loop arc 28 or outer loop arc 29, respectively. The outer loop arcs 29 extend at or near to an outer edge of the snow sliding board; the inner loop arcs 28 extend at a distance from the outer loop arcs 29, nearer to the longitudinal axis $X_A$ of the snow sliding board which is a center axis of the snow sliding board in the longitudinal direction.

In the sketched example, the longitudinal portions 27 of the loops extend radially outwards in the region of the paddle T; the outer loop arcs 29 have a larger diameter than the inner loop arcs 28. Behind the paddle T, the fibers 20 are laid in rectangular loops comprising inner loop arcs 28 and outer loop arcs 29 which are of equal size. The transition from the loops 26 of the paddle T to the rectangular loops in the adjoining region is abrupt, such that two regions which can be clearly distinguished from each other and comprise differently laid fibers 20 are formed.

In an inner region, the front sliding board region A comprises fibers and/or rovings 20 which extend in the longitudinal direction X of the snow sliding board, parallel to the longitudinal axis $X_A$ of the snow sliding board. The fibers and/or rovings 20 are not laid in a looped shape and exhibit a distance from each other which is substantially greater than a distance between adjacent longitudinal portions 27 of the loops in both regions of the outer region. In the example embodiment shown, the inner region forms a third, separate region of the front sliding board region A which exhibits an alignment of the fibers and/or rovings 20 which is different to the alignment in the two mutually adjoining regions of the outer region.

Alternatively, the fibers and/or rovings 20 of the inner region can extend over the entire area of the snow sliding board, at least in the portion shown in FIG. 2, and be overlaid with the fibers and/or rovings 20 of the outer region.

The reinforcing structure 12 shown in FIG. 2 can be a two-dimensional semi-finished product which is cropped before being fitted in the snow sliding board. The outer loop arcs 29 of this cropped piece can be cut away, such that the longitudinal portions 27 of the loops in the finished snow sliding board terminate at the outer circumference of the snow sliding board.

When laying the fibers and/or rovings 20 in loops 26, the semi-finished product for the reinforcing structure 12 can be cropped to the processing size of the reinforcing structure 12 by cutting away at least the outer loop arcs 29, such that the fibers and/or rovings 20 no longer comprise any outer loop arc 29, at least in regions of the outer circumferential periphery, in the finished snow sliding board. The same can apply to the inner loop arcs 28 if the reinforcing structure 12 comprises openings, such as punched holes, in a region which comprises inner loop arcs 28.

Figure 3:
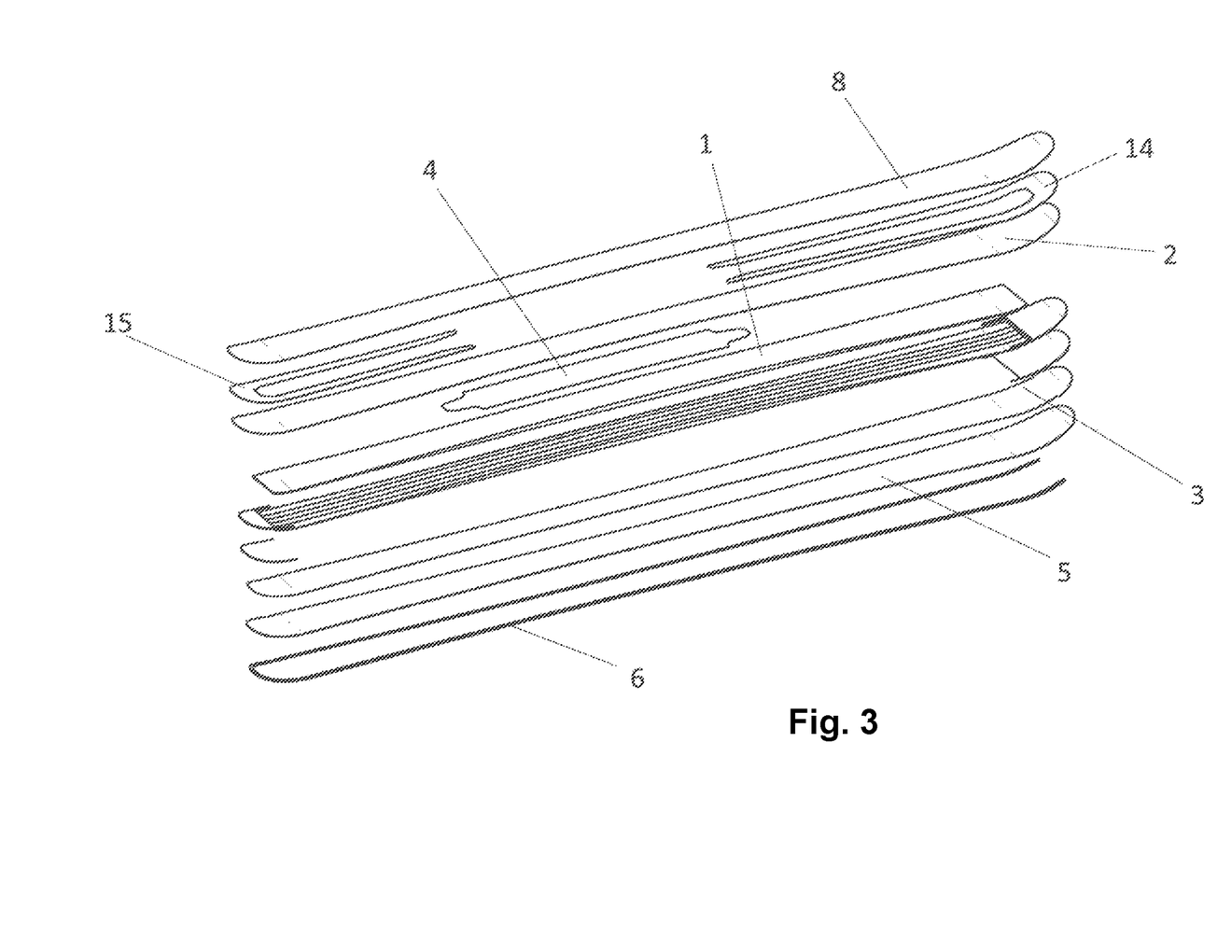
FIG. 3 example of a layered structure of a snow sliding board.

FIG. 3 shows an exploded representation of an example of a snow sliding board comprising all the layers which are joined together to form the finished snow sliding board. In order to describe the invention, it is not necessary to specify and describe all of the layers shown in the example.

Starting from the bottom, FIG. 3 shows: edges 6; a sliding surface layer 5; a lower laminate 3; a core 1; a reinforcing plate 4 in the region B of the snow sliding board for the binding; an upper laminate 2; a reinforcing structure 12, consisting in this case of a front reinforcing structure part 14 and a rear reinforcing structure part 15; and lastly, a cover 8 which forms an upper side of the snow sliding board. At least regions of the cover 8 can be transparent, such that the reinforcing structure 12 can form a design element in the finished snow sliding board.

As shown in the example, the reinforcing structure 12 can be arranged directly below the cover 8 and above the core 1. The reinforcing structure 12 can itself form a part of the cover 8 or can be arranged below the upper laminate 2 but above the core 1. The reinforcing structure 12 can however also be arranged at least partially below the core 1 in the finished snow sliding board.

If the reinforcing structure 12 itself forms part of the cover 8, the reinforcing structure 12 can comprise a protective coating made of a clear varnish or similar material in order to maintain an appealing visual appearance of the surface of the sliding board for as long as possible. The reinforcing structure 12 itself can also comprise a surface which can be printed on, such that for example a brand name, logo or other information can be printed directly onto the reinforcing structure 12.

Unlike the example shown in FIG. 3, the first reinforcing structure part 14 and the second reinforcing structure part 15 can also be assigned to different layers. One of the reinforcing structure parts 14, 15 can then be arranged above the upper laminate 2, and the other can be arranged below the upper laminate 2 or next to the upper laminate 2 which is then correspondingly cropped. If a reinforcing structure part 14, 15 is arranged next to the upper laminate 2 in this way, it effectively forms a part of the layer of the upper laminate 2 in the structure of the snow sliding board shown.

As shown, the reinforcing structure 12 can be manufactured as a semi-finished product and can be stored in a warehouse for subsequent processing. It is possible to adapt the reinforcing structure 12 individually to the abilities of the individual rider of the snow sliding board, wherein said individual abilities can for example be ascertained on a specialized test stand.

Figure 4:
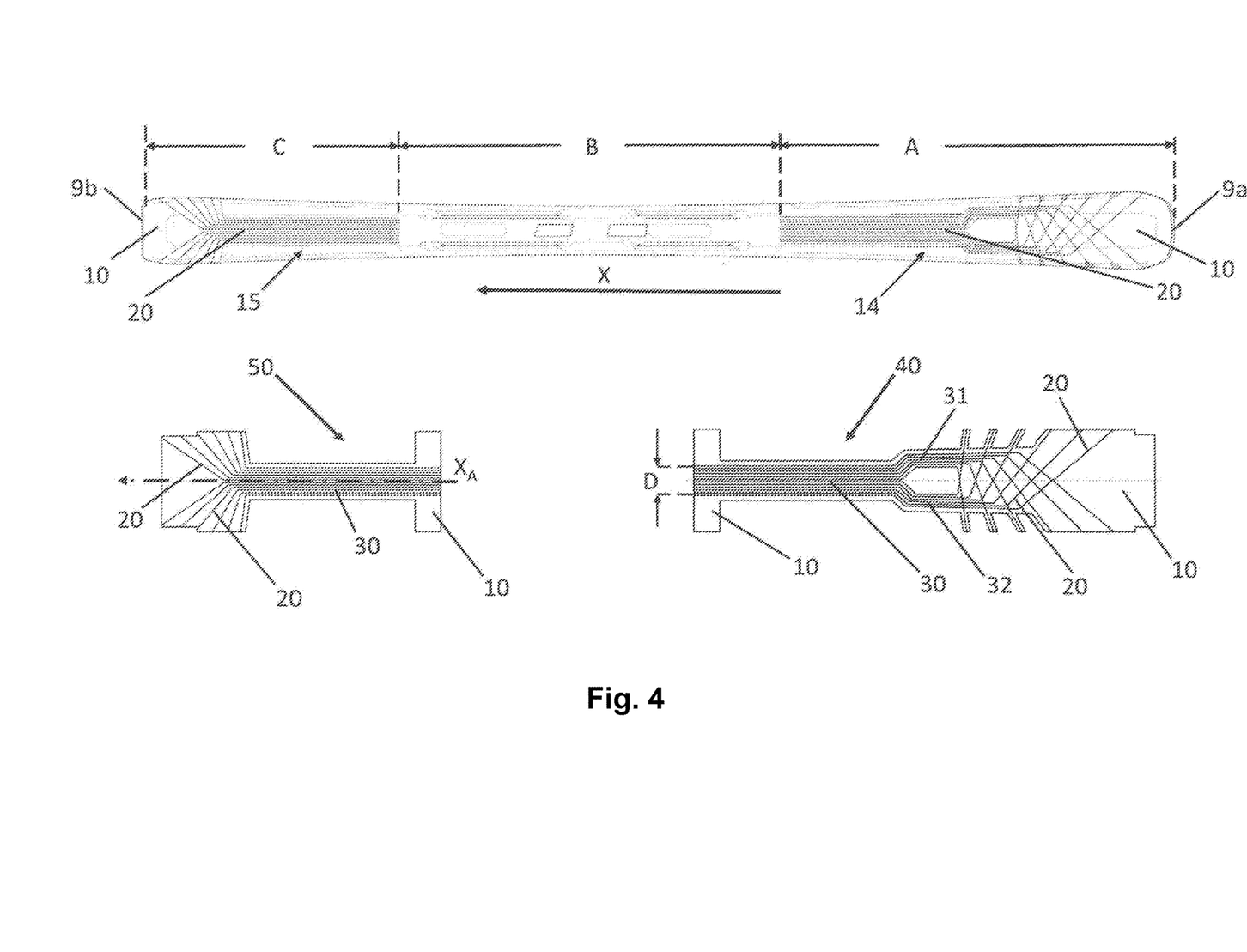
FIG. 4 another example embodiment of a snow sliding board comprising a reinforcing structure.

FIG. 4 shows another sliding board, in a plan view. The sliding board comprises a reinforcing structure part 14 in the front sliding board region A and a reinforcing structure part 15 in the rear sliding board region C, wherein both regions A and C comprise other targeted reinforcements which are each formed from a base material 10 and fibers and/or rovings 20 connected to it.

These reinforcements are shown separately in FIG. 4 as a fiber-composite material semi-finished product 40 for the front sliding board region A and a fiber-composite material semi-finished product 50 for the rear sliding board region C, respectively. In their two-dimensional blank shape shown, the fiber-composite material semi-finished products 40 and 50 exhibit an excess, at least in the region of the front end 9a of the sliding board and the rear end 9b of the sliding board.

The fiber-composite material semi-finished product 40 comprises the base material 10 and fibers and/or rovings 20 which are connected to the base material 10. The fiber-composite material semi-finished product 40 has a length which substantially corresponds to the distance between the front end 9a of the sliding board and the end of the binding region B (the binding region B being arranged between the front sliding board region A and the rear sliding board region C) which faces the front end 9a of the sliding board. Starting at the binding region A, the fibers 20 extend in a main strand 30, substantially parallel to each other and substantially parallel to the longitudinal axis $X_A$ of the snow sliding board, wherein the fibers 20 of the main strand 30 can terminate at the binding region B or extend up to and below or into the binding region B.

The main strand 30 has a width D transverse to the longitudinal direction X of the snow sliding board which substantially corresponds to a distance between the mutually facing inner sides of the side limbs 21, 22 of the reinforcing structure part 14 (see FIG. 1). In the example embodiment, the main strand 30 divides—before it reaches the front end 9a of the sliding board—into two identical partial strands 31, 32 in which the fibers 20 initially extend outwards away from the center axis $X_A$ of the snow sliding board, wherein they are still aligned substantially parallel to each other. Lastly, the individual fibers and/or rovings 20 deviate towards the center axis $X_A$ of the snow sliding board, starting with the two fibers 20 nearest the center axis $X_A$ of the snow sliding board, cross the fibers 20 of the other respective partial strand 31, 32 and extend outwards beyond the base material 10. This occurs sequentially with all the fibers 20 of the first partial strand 31 and second partial strand 32, wherein the deviation angle, i.e. the angle which the center axis $X_A$ of the snow sliding board forms with the fibers 20 which cross the fibers 20 of the remaining partial strands 31, 32, constantly decreases. In the example embodiment, the first deviation angle is about 90°, whereas the deviation angle nearest the front end of the sliding board is only about 45°. This results in the grid-shaped pattern of the fibers 20 as shown in FIG. 4.

The same substantially applies to the fiber-composite material semi-finished product 50 as to the fiber-composite material semi-finished product 40, except that the main strand 30 dissipates radially at its end facing away from the binding region B.

LIST OF REFERENCE SIGNS 1 core
2 upper laminate
3 lower laminate
4 reinforcing plate
5 sliding surface layer
6 edges
8 cover
9a front end of the sliding board
9b rear end of the sliding board
10 base material
12 reinforcing structure
14 reinforcing structure part
15 reinforcing structure part
20 fiber, roving
21 side limb
22 side limb
23 transverse limb
24 transverse limb
26 loop
27 longitudinal portion of the loop
28 inner loop arc
29 outer loop arc
30 main strand
31 partial strand
32 partial strand
40 fiber-composite material semi-finished product
50 fiber-composite material semi-finished product
A front sliding board region
B binding region
C rear sliding board region
D width
T paddle
X longitudinal direction of the snow sliding board
$X_A$ longitudinal axis of the snow sliding board
$X_S$ longitudinal direction of the loops
Y transverse direction of the snow sliding board
y limb distance

The invention claimed is:

1. A sliding board, comprising:
1.1 a front sliding board region which comprises a front end of the sliding board;
1.2 a rear sliding board region which comprises a rear end of the sliding board; and
1.3 a binding region, extending between the front sliding board region and the rear sliding board region in the longitudinal direction of the sliding board, for fixing a sliding board binding for holding a boot;
1.4 wherein the sliding board exhibits a multi-layered structure including at least:
1.4.1 a sliding board core;
1.4.2 upper layers which are arranged above the sliding board core; and
1.4.3 lower layers which are arranged below the sliding board core,
wherein at least one of the upper layers and/or at least one of the lower layers comprises a fiber-composite material,
wherein the fiber-composite material comprises a multitude of fibers,
wherein the fiber-composite material in a region exhibits a fiber orientation which varies within the region,
wherein at least the front sliding board region and/or the rear sliding board region comprises a reinforcing structure part comprising a first side limb and a second side limb, and
wherein the fiber-composite material forms additional reinforcements for the front sliding board region and/or the rear sliding board region comprising a main strand with a width transverse to a longitudinal axis of the sliding board which substantially corresponds to a distance between mutually facing inner sides of the first side limb and the second side limb of the reinforcing structure part.

2. The sliding board according to claim 1, wherein at least a number of the fibers are joined together to form one or more bundles of fibers, or rovings, and the fibers and/or the roving or rovings is/are laid on a base material and fixed in a laying and stitching method.

3. The sliding board according to claim 2, wherein the laying and stitching method is a tailored fiber placement (TFP) method.

4. The sliding board according to claim 1, wherein the fiber-composite material comprises numerous short fibers and/or rovings and/or continuous fibers and/or continuous rovings.

5. The sliding board according to claim 4, wherein at least some of the fibers and/or rovings extend in a meandering or looping shape in a plan view onto the sliding board.

6. The sliding board according to claim 5, wherein the at least some of the fibers and/or rovings comprise inner loop arcs and/or outer loop arcs and longitudinal portions, wherein the longitudinal portions extend linearly or in the shape of an arc and parallel to each other or at an angle to each other or towards each other or apart or away from each other.

7. The sliding board according to claim 6, wherein the longitudinal portions define a longitudinal direction which exhibits an inclination angle $\alpha$ to a central longitudinal axis of the sliding board at least in the front sliding board region and/or rear sliding board region, where $0° \leq \alpha \leq 90°$, wherein the inclination angle $\alpha$ varies in the longitudinal direction of the sliding board.

8. The sliding board according to claim 1, wherein the fiber-composite material forms a frame-shaped reinforcing structure comprising a first side limb, a second side limb, a first transverse limb and a second transverse limb, wherein the frame-shaped reinforcing structure is constructed in one or more parts.

9. The sliding board according to claim 8, wherein the first side limb and the second side limb have a limb distance in the transverse direction of the sliding board, which does not comprise the fiber-composite material, in the region outside of the transverse limb(s).

10. The sliding board according to claim 1, wherein the sliding board has an upwardly projecting, raised upper side portion which extends from the binding region up to or into the front sliding board region and/or from the binding region up to or into the rear sliding board region.

11. A fiber-composite material layer for a sliding board, wherein the fiber-composite material layer comprises a multitude of aligned fibers and/or rovings in a first region and a multitude of aligned fibers and/or rovings in a second region which adjoins the first region, wherein an alignment of the fibers and/or rovings in the first region is different from an alignment of the fibers and/or rovings in the second region,
wherein the multitude of aligned fibers the first region and/or in the second region comprise a main strand substantially parallel to a longitudinal center axis of the fiber-composite material with substantially parallel aligned fibers, which main strand divides into two partial strands in which the fibers initially deviate outwards away from the center axis of the fiber-composite material still being aligned substantially parallel to each other, starting with the two fibers nearest to the center axis with a first deviation angle of about 90°.

12. The fiber-composite material layer according to claim 11, wherein the fiber-composite material forms a reinforcing structure.

13. The fiber-composite material layer according to claim 11, wherein the fibers are formed from a carbon material, glass material, aramid material, stone material, natural fiber material, plastic material, textile material, metal material, or ceramic material, and rovings consist of a multitude of fibers made of a single material or different materials.

14. The fiber-composite material layer according to claim 11, wherein the fibers and/or rovings are laid on a base material by a TFP method.

15. The fiber-composite material layer according to claim 14, wherein the fibers and/or rovings are laid on the base material in a looped shape.

16. A sliding board, comprising:
  1.1 a front sliding board region which comprises a front end of the sliding board;
  1.2 a rear sliding board region which comprises a rear end of the sliding board; and
  1.3 a binding region, extending between the front sliding board region and the rear sliding board region in the longitudinal direction of the sliding board, for fixing a sliding board binding for holding a boot;
  1.4 wherein the sliding board exhibits a multi-layered structure including at least:
    1.4.1 a sliding board core;
    1.4.2 upper layers which are arranged above the sliding board core; and
    1.4.3 lower layers which are arranged below the sliding board core,
  wherein at least one of the upper layers and/or at least one of the lower layers comprises a fiber-composite material,
  wherein the fiber-composite material comprises a multitude of fibers, and
  wherein the fiber-composite material in a region exhibits a fiber orientation which varies within the region,
  wherein the multitude of fibers in at least the front sliding board region comprise a main strand substantially parallel to a center axis of the sliding board with substantially parallel aligned fibers adjacent to the binding region which main strand divides into two identical partial strands outside the binding region in which the fibers initially extend outwards away from the center axis of the sliding board still being aligned substantially parallel to each other, and then deviate towards the center axis, starting with the two fibers nearest to the center axis.

17. A sliding board, comprising:
  1.1 a front sliding board region which comprises a front end of the sliding board;
  1.2 a rear sliding board region which comprises a rear end of the sliding board; and
  1.3 a binding region, extending between the front sliding board region and the rear sliding board region in the longitudinal direction of the sliding board, for fixing a sliding board binding for holding a boot;
  1.4 wherein the sliding board exhibits a multi-layered structure including at least:
    1.4.1 a sliding board core;
    1.4.2 upper layers which are arranged above the sliding board core; and 1.4.3 lower layers which are arranged below the sliding board core, wherein at least one of the upper layers and/or at least one of the lower layers comprises a fiber-composite material, wherein the fiber-composite material comprises a multitude of fibers, and wherein the fiber-composite material in a region exhibits a fiber orientation which varies within the region, wherein the multitude of fibers in the front sliding board region and/or rear sliding board region comprise a main strand adjacent to the binding region, wherein the fibers of the main strand are aligned substantially parallel to each other, and wherein the individual fibers of the main strand deviate outside the binding region away from a center line of the sliding board near the front end of the sliding board and/or the rear end of the sliding board.

* * * * *